United States Patent [19]

Schönherr

[11] 4,178,586

[45] Dec. 11, 1979

[54] BISTABLE DEVICE FOR REPRESENTATION OF A POINT OF A TACTILE INFORMATION

[76] Inventor: Klaus P. Schönherr, Schloss Solitude 3, Stuttgart 1, Fed. Rep. of Germany, 7000

[21] Appl. No.: 929,695

[22] Filed: Jul. 31, 1978

[30] Foreign Application Priority Data

Aug. 3, 1977 [DE] Fed. Rep. of Germany ....... 2734886
Nov. 5, 1977 [DE] Fed. Rep. of Germany ....... 2749585

[51] Int. Cl.² .......................................... G09B 21/00
[52] U.S. Cl. .................................... 340/407; 340/373
[58] Field of Search ................... 340/407, 336; 358/94

[56] References Cited

U.S. PATENT DOCUMENTS 3,987,438  10/1976  Linden Mueller ............... 340/407

*Primary Examiner*—Harold I. Pitts
*Attorney, Agent, or Firm*—Martin A. Farber

[57] ABSTRACT

A bistable device for representation of a point of a tactile information having an axially displaceable touch pin, an electromagnet moving the touch pin, and a lower permanent magnet located cooperatively adjacent the lower pole of the electromagnet and connected to a locking body for moving the locking body from an inoperative position into an operative position, permitting and blocking, respectively, displacement of the touch pin into its inoperative lowered position. A nonmagnetic rod lengthens the touch pin and cooperates with the locking body at the rear. Between a touchable end of the touch pin and the adjacent front pole of the electromagnet, an upper permanent magnet is arranged on the touch pin and/or on the lengthening rod. The two poles of the permanent magnets which point to the poles of the electromagnet are alike. Alternately the locking body can be connected to the rear end of the rod, both being made of a non-retentive magnetizable material, and is separate from the lower permanent magnet cooperating therewith, without the necessity for the upper permanent magnet; the locking body is pivotable and axially shiftable onto two likewise staggered engagement planes, the lower permanent magnet being immoveable and defining a pole axis substantially perpendicular to the shifting direction.

11 Claims, 4 Drawing Figures

BISTABLE DEVICE FOR REPRESENTATION OF A POINT OF A TACTILE INFORMATION

BACKGROUND OF THE INVENTION

The invention relates to a bi-stable apparatus for representation of a point of a tactile information, with a touch pin, which touch pin is axially displaceable between a lifted position, in which its touchable end projects over a touch surface, and a lowered position in which its touchable end does not project over the touch surface, and with two magnets, of which at least one is an electromagnet moving the touch pin and one moves a locking body which locking body is displaceable or shiftable from an inoperative position into an operative position, and reversely, in the inoperative position the locking body freeing the displacement of the touch pin into its lowered position, in the operative position the locking body blocking the displacement of the touch pin into its lowered position.

With one device of this type which is known from U.S. Pat. No. 3,987,438 and corresponding German Offenlegungsschrift OS No. 2 407 452 (FIG. 1), the touch pin (10) is moved against the force of a return setting spring (24) into the set position (indicated by points) by the magnetic force which is exerted from a first magnetic coil (26) on its longitudinally displaceable core (12), in which set position, the touch pin is locked by means of a locking device, which locking device comprises a steel ball (28) and a second magnetic coil (44) with a core which is longitudinally displaceable in the coil. If the touch pin (10) is set, then, when the touch pin (10) has reached the set position, this ball (28) is pulled from the core (36) of the second magnetic coil (44), on which core a prestressed spring (50) engages, and by the magnetic field of the first magnetic coil (26) into the locking position, in which position the return path into its release position is blocked by the following core (36) of the second magnetic coil (44). In order to again transport the touch pin (10) into its cleared position (indicated in solid lines), the core (36) must be moved by the magnetic force produced by the second magnetic coil (44) against the force of the spring (50) engaging on the core into its release position, in which release position the core is locked by the steel ball (28), the steel ball being held fixed in this position by the core (12) of the first magnetic coil (26). For the setting as well as also for the clearing thus one of the two cores (12, 36) must be pushed into the other position by the magnetic force produced by the coordinated magnetic coil (26 and 44, respectively) against the spring (24 and 50, respectively), which spring engages on the core (12 and 36, respectively). Thus results in a relatively high energy requirement of the device. Moreover still with every change of the condition of the touch pin (10), the ball (28) of the locking device must be torn free from one of the two cores (12 or 36), which still increases the energy requirement. In view of the manufacturing expense, the multiplicity of the individual parts is disturbing, and with the assembly into arrangements with a multiplicity of touch pins it is practically impossible, to accommodate plug-in connections for all terminals or connections in the space which stands available, especially when between the touch pins the usual spacings are to be maintained with the representation of braille characters.

Also another device which is known from U.S. Pat. No. 3,987,438 or German Offenlegungsschrift OS No. 2 407 452 (FIGS. 2, 3) has a high energy requirement, a comparatively high manufacturing expense and a relatively large spacial requirement, which device differs from the previously mentioned body by another locking device. The end (154) of the core (112) of a first magnetic coil (126), which end is remote from the touch pin (110) as well as the end (158) which points to this core (112) of the core (136) of a second magnetic coil (144), which core (136) is arranged in alignment with this core (112), or of a permanent magnet are formed such that upon the setting of the touch pin (110), the magnetic force acting on the core (112) of the first magnetic coil (126) displaces this core (112) first into its longitudinal direction and upon reaching the set position turns it about its longitudinal axis. By this rotation the lower end (154) of the core (112) of the first magnetic coil (126) comes into a position in which it is held fixed by a step (159) on the upper end (158) of the core (136) of the second magnetic coil (144). Upon the transfer of the touch pin (110) from the set position (b) into the cleared position (a), the touch pin (110) together with the core (112) of the first magnetic coil (126) must first execute a rotational movement, so that it can become free of the step (159) and thereafter it can execute the translational movement providing the return stroke.

SUMMARY OF THE INVENTION

The invention is based on the task to create a bi-stable apparatus for representation of at least one point of a tactile information, which needs a reduced energy and spacial requirement as well as a lower manufacturing expense. This task is aided in its solution by a device of the introductory mentioned type in accordance with the invention in a first way in the manner that the electromagnet (for example, 18) has an immoveable hollow core (28; 128) which is surrounded by a magnetic coil (30), in which hollow core there is moveably guided a non-magnetic rod (14; 114) which rod lengthens the touch pin (12), the end of the rod, which end faces away from the touchable end (26) of the touch pin (12) cooperates with the locking body (16; 116); that between the touchable end (26) of the touch pin (12) and the adjacent front pole (32) of the electromagnet (18) there is arranged a first permanent magnet (20) on the touch pin (12) and/or on the lengthening rod (14; 114), the straight pole axis of which permanent magnet (20) lies parallel to the axis of the rod; that to the rear pole (34) of the electromagnet (18), which rear pole faces away from the first permanent magnet (20), there is arranged a second permanent magnet (22; 116), which second permanent magnet forms a moveable unit with the locking body (16; 116), the operative pole (S) of the second permanent magnet lying remote from the rear pole (34) of the electromagnet (18) in the inoperative position of the locking body (16; 116) and is closely adjacent to this rear magnet pole (34) in the operative position of the locking body (16; 116); and that those two poles (S, S; S) of the two permanent magnets (20, 22; 116) which poles point to the poles (32, 34; 134) of the electromagnet (18) are alike.

This device in accordance with the invention in any case suffices with a single electromagnet, two simply formed permanent magnets, and without springs, so that it is able to be produced simply, and as a consequence of this inexpensively, and leads to a very high energy conservation, since for its actuation merely a shorter current impulse for the magnetic coil is required in order to change the condition of the device. A presumption for this is, of course, that the locking body will stay in its operative or inoperative position as long as the magnetic coil is not triggered.

A further advantage of the device according to the invention resides in that it is able to be executed with a comparatively small construction height, since no two electromagnets must be arranged essentially one behind the other.

With embodiment forms of the device in accordance with the invention which are preferred because of their simplicity, the locking body is able to be pivoted about an axis which runs perpendicularly or parallel to the displacement direction. By means of a wedge as a locking body, which is supported on the bottom along its apex line and is able to be tilted about the apex line between two end positions and whose face side which points away from the apex line forms a locking surface for the rod, a simple self-locking of the locking body is brought about in its operative position. Selectively the locking body can be formed for example L-shaped with a circular cross-section, whereby one leg thereof is rotatably mounted about its longitudinal axis and its other leg forms a locking part for the rod. In this case (displacement direction and axis of rotation vertically arranged) it is advantageous to asymetrically form the rear pole of the electromagnet or to provide an auxiliary pole, so that the locking body in fact is rotated up to its operative position. Also here a self-locking of the locking body on the end of the rod occurs, which however is not unconditionally necessary, since the locking body remains standing in each rotary position as long as no magnetic forces act on it.

A first of the preferred embodiment forms is characterized in the manner that the second permanent magnet with its operating pole projects from the locking surface and with its other pole sticks into the wedge serving as the locking body. In this manner the production of the constructional unit made of the wedge and magnet are particularly simple and the magnetic field of the second permanent magnet is completely utilized, since there is no screening of the magnetic pole which projects from the wedge.

With a second of the preferred embodiment forms, the second permanent magnet and the locking body are identical, i.e., they relate to one and the same part of the apparatus, namely a totally magnetic locking body, which, for example, has the mentioned L-shape.

For the arrangement and application of the first permanent magnet different possibilities exist. The first permanent magnet can axially connect the rod with the touch pin or it can be mounted on or in the touch pin or rod. Most advantageous for the manufacturing technique is yet when the touch pin and the rod are formed in one-piece and the first permanent magnet is incorporated or inserted on a suitable position.

The set task in view of the manufacturing expense, still can be aided in its solution somewhat better. It is solved with a device of the introductory mentioned type in accordance with the invention in a second way in the manner that the electromagnet (e.g., 18) has an immoveable hollow core (36), the latter being surrounded by a magnetic coil (38), in which hollow core there is moveably guided a non-magnetic rod (14), the latter lengthening the touch pin (12), that end of the rod which faces away from the touch pin (12) cooperates with the locking body (16); that a permanent magnet (22) is arranged near to the rear pole (46) of the electromagnet (18), which rear pole faces away from the touch pin (12); that the locking body (16) is pivotable about an axis (50) running parallel to the shifting direction; that the non-magnetic rod (14) is made of a non-retentive magnetizable material; that the locking body (16) is made of the same material and is attached or formed one-piece on the end (44) of the rod (14), which end (44) is adjacent to the rear pole (46) of the electromagnet (18); that the permanent magnet (22) is immoveably arranged with its pole axis approximately perpendicularly crossing the shifting direction; that the locking body (16) forms a magnet pole cooperating simultaneously with both poles of the permanent magnet (22), which magnet pole with excitation of the electromagnet (18) produces a turning moment, which turning moment swings the locking body (16) in a direction of rotation which is dependent on the excitation; and that the inoperative position and the operative position of the magnet pole on the locking body (16) are determined by two engagement planes (52, 54) for the locking body (16), which engagement planes are offset in the direction of pivoting, and which engagement planes are parallel to the swinging plane of the locking body (16), the spacing of the engagement planes measured in the shifting direction is as large as the difference in height between the lifted position of the touch pin (12) and its lowered position. The two devices in accordance with the invention which solve the task of the invention in the first or second way, respectively, correspond in the manner that the electromagnet has a non-moveable hollow core surrounded by a magnetic coil, in which hollow core there is moveably guided a non-magnetic rod, the latter lengthening the touch pin, the end of the rod which is turned away from the touch pin cooperates with the locking body; that a permanent magnet is arranged to the pole of the electromagnet which faces away from the touch pin; and that the locking body is pivotable about an axis which runs parallel to the displacement direction.

Besides the mentioned advantages, which the inventive device named in the first place already has in comparison to the two devices known from U.S. Pat. No. 3,987,438 and German OS No. 2 407 452, the inventive device named in the second place has the additional advantage that one permanent magnet is done away with and the locking body can be produced very simply, for example, by bending (by 90°) one free end of a metal blank, the longer straight section of which blank forms the rod. The two contact engagement planes of this second device in accordance with the invention, for example, can be part of a step, which step is arranged adjacent to the (single) permanent magnet and with the locking body forms a lock for the touch pin. Corresponding to the height of the steps, the permanent magnet can be arranged with the vertical displacement direction inclined toward the horizontal, so that the attraction and repelling of the locking body by the poles of the inclined-positioned permanent magnet takes place in an inclined plane considering the step, which inclined plane has horizontal lines of strike and includes the pole axis of the permanent magnet as the slope-line.

The manner of operation of the second device in accordance with the invention is based on the production of counter-sense rotational moments by magnetic attraction forces and repelling forces for the locking and unlocking of the locking body, which rotational moments forcefully causes a rotational movement of the rod to precede or follow the electromagnetically controlled stroke movement of the rod. The combination of both types of movement thus consist in an addition, that is, in the sequential performance of both movements. With a device which is conceivable both movements of a rotor with permanent magnet could occur simultaneously, which however would cause frictional losses therewith.

BRIEF DESCRIPTION OF THE DRAWINGS

In the following the invention is explained in detail on the basis of three preferred embodiment forms of the device in accordance with the invention, which embodiment forms are illustrated for example by the drawing. It shows.

DESCRIPTION OF THE PREFERRED EMBODIMENT

Figure 1:
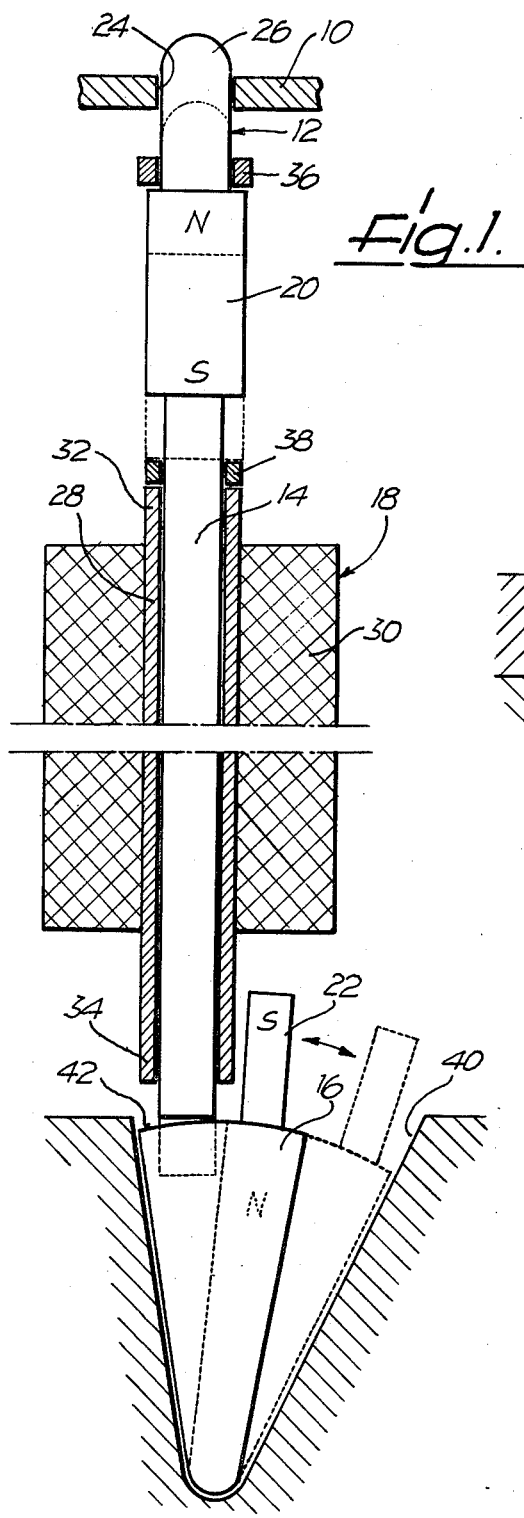
FIG. 1 is a schematic and interrupted illustrated vertical section through a first embodiment form.
Figure 2:
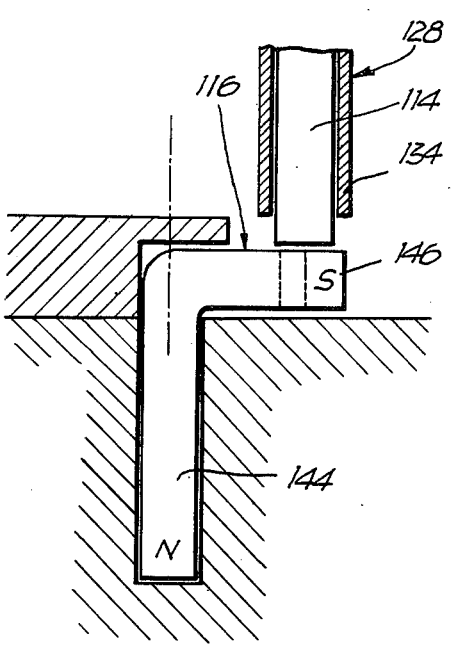
FIG. 2 is the lower part of a second embodiment form in corresponding illustration.
Figure 3:
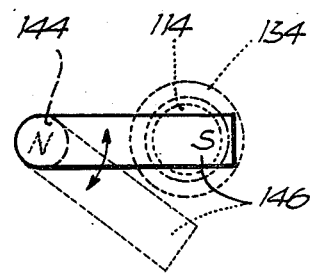
FIG. 3 is a schematically illustrated top plan view on that shown in FIG. 2.

The two embodiments according to FIGS. 1 to 3 substantially comprise a planar touch surface 10, a touch pin 12, a rod 14 and 114, respectively, a locking body 16 and 116, respectively, an electromagnet 18, a first permanent magnet 20 and a second permanent magnet 22 and 116, respectively, of which permanent magnets the magnet 116 is identical with the locking body 116.

The touch surface 10 is planar and horizontal and for example can form the upper surface of a reading device for the blind. It is provided with a bore 24, the diameter of the bore being adjusted to the diameter of the touch pin 12.

The circular-cylindrical touch pin 12 is provided on its upper end with a semispherical-shaped cap or dome 26, the dome being located over or underneath the sensing surface 10 depending upon the height position of the touch pin.

The rod 14 and 114, respectively, is likewise circularly-cylindrical and is made of a non-magnetic material, for example, made of self-lubricating plastic.

Between the vertically extending rod 14 and 114, respectively, and the coaxial sensing pin 12, there is arranged a first permanent magnet 20 in the form of a bar magnet, which bar magnet connects the sensing pin with the rod and for example has its north pole N upwardly.

The rod 14 and 114, respectively, is guided in the circular cylindrical hollow core 28 of a magnetic coil, the hollow core 28 being made of a magnetizable material, which magnetic coil forms the electromagnet 18 and has a concentric winding 30, from which winding there project the two ends of the hollow core 28, above as the front pole 32 and underneath as the rear pole 34 and 134, respectively.

The touch pin 12 and the rod 14 and 114, respectively, each are surrounded by one stationary abutment ring 36 and 38, respectively, between which rings there is arranged the first permanent magnet 20.

With the first embodiment according to FIG. 1, under the electromagnet 18 there is present an upwardly opening substantially wedge-shaped opening 40 in the material, the horizontal ground or bottom of which material opening 40 is arcuately-shaped. In the recess 40 there engages a wedge 16 as a locking body, the horizontal apex line of the wedge, which apex line is supported by the bottom of the recess 40, is correspondingly rounded. The wedge 16 is able to be tilted back and forth between two end positions, which end positions are both indicated in FIG. 1 and yield an operative and inoperative position, respectively, of the locking body. The face side of the wedge 16, which side faces away from its apex line, forms a slightly convex locking surface 42. The rod-shaped second permanent magnet 22 projects from the locking surface 42 adjacent to the lower pole 34 of the electromagnet 18, the rod-shaped second permanent magnet 22, for example, sticking into the wedge 16 with its north pole end. The arrangement is thereby made such that the center of gravity of the moveable construction unit conprising the wedge 16 and the magnet 22, viewed from the pole 34, lies on the other side of the tipping- and apex- line of the wedge, which tipping- and apex- line perpendicularly crosses the rod axis, thereby however does not cut.

The manner of operation of the first embodiment according to FIG. 1 is as follows:

Assuming starting from the condition indicated in FIG. 1, in which the crown 26 of the touch button 12 projects from the touch surface 10 and in the manner that the tactile information gives ONE or YES. Moreover the first permanent magnet 20 with its north pole N engages on the upper abutment ring 36, while its south pole S is located spaced apart from the lower abutment ring 38. Further the south pole S of the second permanent magnet 22 is closely adjacent to the lower pole 34 of the electromagnet 18. Finally the lower end of the rod 14 stands on the locking surface 42 of the wedge 16 and loads the wedge 16 on that side of the tipping- and apex- line of the wedge 16, which side is opposite to the center of gravity of the unit 16–22.

When the winding 30 of the electromagnet 18 now receives a DC impulse, which impulse makes the lower pole 34 into the south pole, the latter repels the south pole S of the second permanent magnet 22, so that the wedge 16 is tipped from its operative position, which is indicated in FIG. 1 with full lines, into its inoperative position which is indicated with dashed lines, as indicated by the double arrow. In the event the current impulse lasts sufficiently long, on the construction unit, which is made of the touch pin 12, the first permanent magnet 20 and the rod 14, not only does the gravitional force act but also the attractive force between the south pole S of the first permanent magnet 20 and the pole 32 of the electromagnet 18, which pole 32 acts as the north pole and is adjacent to the first permanent magnet 20, so that the previously locked lowering movement of the rod 14 is now released, and its lower end, as FIG. 1 indicates, engages in the recess 40 next to the wedge 16. The penetration depth is determined by the lower abutment ring 38, which abutment ring 38 intercepts the south pole S of the first permanent magent 20 at the end of the downwardly directed displacement of the rod 14. In this manner the touch pin 12 arrives from its elevated position into its lower position, in which latter position its dome 26 occupies the position underneath the touch surface 10, which position is indicated with dashed line, so that the information ZERO or NO is given.

In the event the information ONE or YES is to be given again, the winding 30 of the electromagnet 18 receives a current impulse with reversed sign, which causes the south pole S of the permanent magnet 20 to be repelled from the upper pole 32 of the electromagnet, which upper pole now is a south pole, so that the touch pin 12 is pushed out from the touch surface 10 and the rod 14 is redrawn until the north pole N of the magnet 20 strikes against the upper abutment ring 36. Now, also the locking surface 42 of the wedge 16 steps under the lower end of the rod 14 and can support it, since the south pole S of the second permanent magnet 22 is attracted by the lower pole 34 of the electromagnet 18, the lower pole now acting as the north pole. Consequently the starting condition is again reached.

It is not necessary to continuously feed the electromagnet 18, since the inoperative position of the wedge 16 is stable and its operative, per se unstable position (which also could be a stable position), is secured by self-locking by means of the rod 14.

The second embodiment according to FIGS. 2 and 3 differs from the first, essentially in the manner that the locking body 116 and the second permanent magent 116 are one and the same part. It is essentially L-shaped with a circular cross section, whereby a vertical leg 144 forms the north pole and its horizontal leg 146 forms the south pole. The vertical leg 144 is, as the double arrow in FIG. 2 indicates, a rotatably mounted, so that the horizontal leg 146, as FIG. 3 shows, can be swung under the lower end of the rod 114 or can be moved away from this end. The drive force for this supplies the lower pole 134 at the hollow core 128 of the electromagnet.

Figure 4:
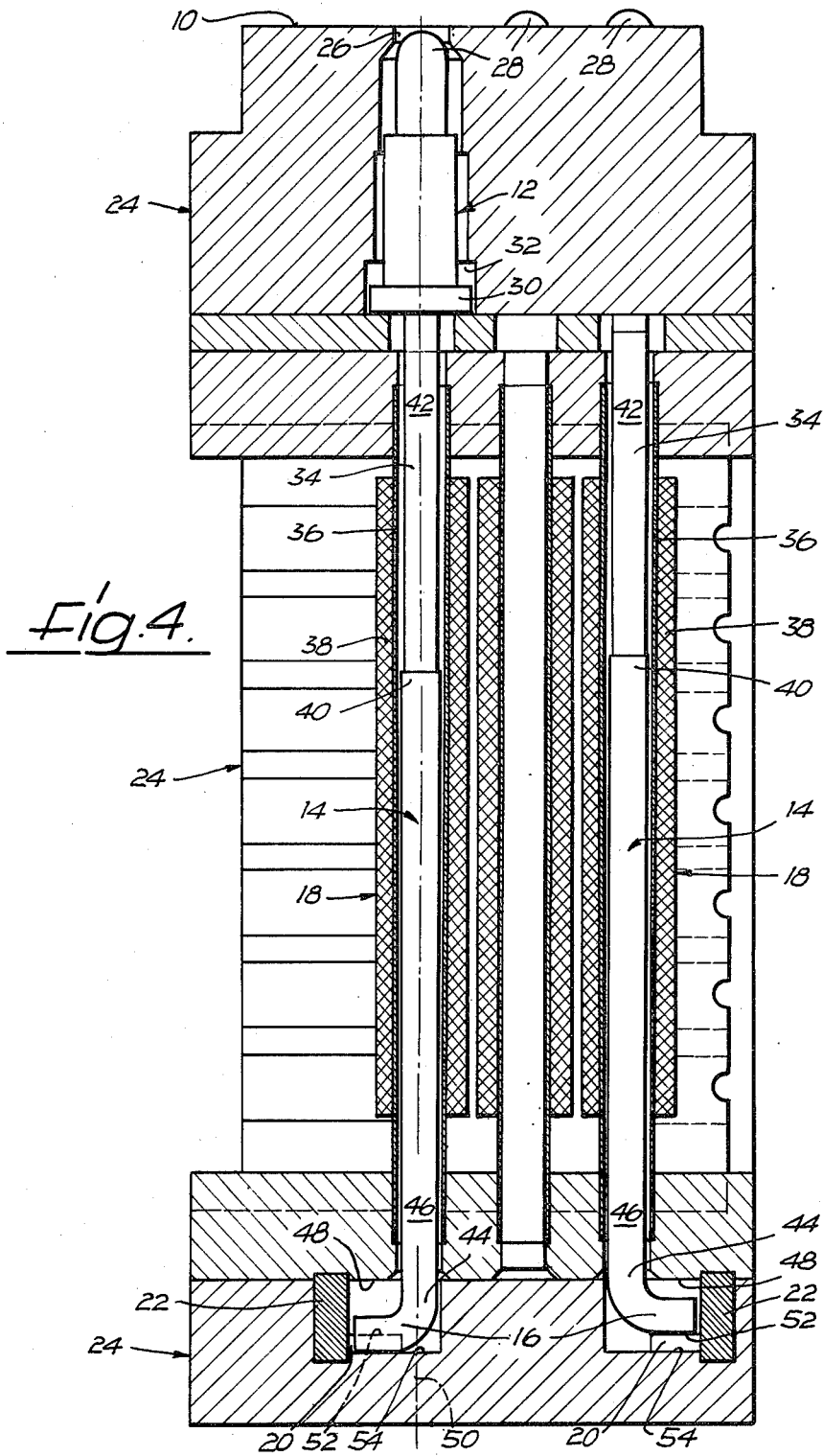
FIG. 4 is a vertical longitudinal section through a braille module with three devices to be seen (touch units) in a third embodiment.

The third embodiment-forms according to FIG. 4 essentially comprise respectively each one planar touch surface 10, a touch pin 12, a rod 14, a locking body 16, an electromagnet 18, a step 20 and a permanent magnet 22. The touch surface 10 is formed by a multi-part, housing 24 which receives all remaining named parts of the embodiment. The surface 10 is flat and horizontal and, for example, can form the upper surface of a reading device for the blind. The upper surface is formed with one bore 26 for each touch pin, the diameter of the bore being adjusted to the diameter of the touch pin 12 which is coordinated to it in the vicinity of the touch surface 10.

Each circular cylindrical touch pin 12 is provided on its upper end with a semispherical-shaped dome 28, which dome is located, depending upon the height position of the touch pin, above or below the touch surface 10. The touch pin 12 has an outer collar 30 which is axially displaceably mounted in a cylindrical hollow space 32 of the housing 24 and with its two reversed positions, determines or fixes the raised position of the touch pin 12, in which position its dome 28 projects over the touch surface 10, and determines the lower position of the touch pin 12, in which lower position the dome 28 stands behind the upper surface plane of the touch surface 10, as the drawing shows for both positions. The touch pin 12 has a relatively thin shaft 34 beginning at the outer collar 30. The touch pin 12 with the shaft 34 engages in electromagnet 18 beyond the upper pole of the electromagnet 18.

The free rods 14 which are coaxially fastened to the lower shafts 34 of the touch pins 12 are likewise circularly cylindrical and as the touch pins 12, which for example can be produced from plastic, are made of a non-magnetic however magnetizable material which is low in retentivity such as soft iron, which essentially exhibits a non-retentive ferromagnetism. Each rod 14 is guided in the hollow core 36 of the magnetic coil, which forms the electromagnet 18 associated therewith and has a concentric winding 38. The two ends of the hollow core 36 project from this winding 38. Most important is that the upper or front end 40 of the rod 14 stands under or, respectively, behind, the upper or, respectively, front pole 42 of the electromagnet, and indeed independently of which axial position the rod occupies. Moreover it is to be noted that the lower or rear end 44 of the rod 14 continuously projects from the hollow core 36 and stands under and, respectively, behind the lower or, respectively, rear pole 46 of the electromagnet 18.

Each locking body 16 forms the free end of a metallic blank, which free end is bent by 90°, the longer straight section of the blank forming the rod 14 which belongs thereto. The locking body 16 thus describes with its bent longitudinal axis, a quarter of a circle, the ends of which are linearly tangentially continued. Moreover the locking body 16 is formed or attached in one piece on the rod 14. As a consequence of this, both are made of the same material and both have the same round circular cross-sectional shape. Each locking body 16 engages in a hollow space 48 of the housing 24, in which hollow space the locking body 16 can be pivoted back and forth over 35° about the longitudinal axis 50 of the rod 14.

One of the steps 20 projects in each hollow space 48. The step is rectangular or orthogonal and has two parallel contact engagement planes 52 and 54. The longitudinal axis 50 providing the displacement direction of the touch pin 12 extends perpendicularly to the engagement planes 52 and 54, and their vertical spacing is as large as the difference in height between the raised position of the dome 28 and its lowered position, thus it is the same size as the displacement path of the outer collar 30. The step 20 is located beyond the extension of the hollow core 36 of the electromagnet 18; consequently the horizontal free end of the locking body 16, which free end extends perpendicularly to the longitudinal axis 50, actually can be shifted from engagement plane to engagement plane of the step 20 without large swinging movements.

Each hollow space 48 is bound on one side by one of the right parallelepiped or cuboid-shaped permanent magnets 22. This magnet is arranged such that its pole axis lies horizontally and the longitudinal axis 50 crosses perpendicularly thereto, thus does not intersect. The two poles of the permanent magnet 22 are disposed adjacent the engagement planes 52 and 54, respectively. Thus one pole is coordinated to each contact engagement plane. The locking body 16 with its free end always points toward the permanent magnet 22 and is aligned alternately to one of its poles or the other pole, respectively, when said free end itself forms an electromagnetically produced magnetic pole. If this is not the case, the free end remains aligned on the pole of the permanent magnet 22 which it has reached, since it is statically attracted.

The manner of operation of the third embodiment according to FIG. 4 is as follows:

Assuming starting from the condition indicated in the left in the drawing, in which the dome 28 of the touch pin 12 stands in back of the touch surface 10 and in this manner the tactile information ZERO or NO is given. Moreover the locking body 16 stands on the lower or rear contact engagement surface 54 of the step 20, whereby the free end of the locking body is closely adjacent one pole of the permanent magnet 22.

If the winding 38 of the electromagnet 18 now receives a direct current impulse, which makes the lower pole 46, for example, the south pole, also at the free end of the locking body 16 a south pole is formed, which south pole projects opposite to the south pole of the permanent magnet 22. Since like poles repel, the magnetic forces attempt to swing the locking body 16 so that the adjacent poles are spaced apart or remote from one another. However this can only occur after the direct current impulse, by pulling the rod 14 into the winding 38 of the electromagnet 18, has led to a stroke of the rod, which stroke lifts the locking body 16 to the level of the upper or front contact engagement plane 52 of the step 20, so that this step 20 no longer can prevent the pivotal movement. At the end of the pivotal movement, the south pole at the free end of the locking body 16 stands opposite to the north pole of the permanent magnet 22 and the engagement plane 52 supports the locking body. As a consequence of the stroke of the rod 14, the touch pin 12 has been pushed upwardly or forwardly, so that its dome 28 now projects over the touch surface 10. Consequently the "setting" of the touch pin 12 is completed.

For "clearing" of the touch pin 12, the winding 38 of the electromagnet 18 receives a counter-sense direct current impulse, which makes the lower pole 46 of the electromagnet a north pole and correspondingly makes the free end of the locking body 16 a like pole, which pole is repelled from the north pole of the permanent magnet 22, so that the locking body now is swung in the reverse direction, whereby its north pole is attracted by the south pole of the permanent magnet. Thereby the locking body 16 leaves the engagement plane 52 and falls back on the lower or rear engagement plane 54 of the step 20. This falling movement is assisted by the thrusting of the rod 14 out from the winding 38 of the electromagnet 18, which is caused by a helical spring surrounding the touch pin 12, which helical spring is supported on the edge of the bore 26 and on the outer collar 30, respectively, or yet is caused by a small permanent magnet, which magnet is arranged on that end of the shaft 34, which end carries the touch pin 12.

I claim:

1. A bistable device for representation of a point of tactile information, comprising
   a housing defining an upper touch surface formed with a vertical bore,
   a touch pin having an upper touchable end and being axially displaceably disposed in said bore between a lifted position, in which said touchable end projects said touch surface and a lowered position in which said touchable end is underneath said touch surface,
   a locking body operatively cooperating with said touch pin and mounted in said housing displaceable from an inoperative position into an operative position and reversely, in said operative position said locking body blocks a displacement of said touch pin into said lowered position, in said inoperative position said locking body permits the displacement of said touch pin into said lowered position,
   an electromagnetic means for operatively moving said touch pin, said electromagnet means has an immoveable hollow core and a magnetic core surrounding said hollow core, said electromagnetic means forms an upper front pole and a lower rear pole,
   a non-magnetic rod is moveably guided in said hollow core, said rod lengthens said touch pin, and said rod has a rear portion facing away from said touchable end of said touch pin, said rear portion cooperates with said locking body,
   a first permanent magnet mounted on said touch pin and/or on said rod between said touchable end of said touch pin and said front pole of said electromagnet means, said front pole being adjacent to said first permanent magnet, said first permanent magnet defines a straight pole axis parallel to the axis of said rod,
   said locking body is moveably disposed in said housing under said rear portion of said rod,
   a second permanent magnet arranged operatively adjacent said rear pole of said electromagnet means, said rear pole facing away from said first permanent magnet, said second permanent magnet is connected with said locking body and forms a moveable unit with said locking body, said second permanent magnet has an operative pole spaced remote from said rear pole of said electromagnet means in said inoperative position of said locking body and lying closely adjacent to said rear pole of said electromagnetic means in said operative position of said locking body,
   said operative pole of said second permanent magnet facing said rear pole of said electromagnet means and is pole-wise the same as one pole of said first permanent magnet, said one pole of said first permanent magnet facing said front pole of said electromagnet means.

2. The device according to claim 1, wherein said locking body is pivotable about an axis which extends perpendicularly to the displacement direction of said rod.

3. The device according to claim 1, wherein said locking body is pivotable about an axis which extends parallel to the displacement direction of said rod.

4. The device according to claim 2, wherein said locking body is formed as a wedge defining an apex line, said locking body is supported along said apex line and is tiltable about the latter between two end positions, and said locking body is formed with a face side which faces away from said apex line and constitutes a locking surface for said rod, said locking surface is moveably disposed under said rod.

5. The device according to claim 3, wherein said locking body is formed L-shaped defining two legs and has a circular cross-section, one of said legs is rotatably mounted about its longitudinal axis and the other of said legs forms a locking part moveably disposed under said rod.

6. The device according to claim 4, wherein said second permanent magnet projects from said locking surface with said operative pole extending therefrom and has another pole, the latter sticks in said wedge.

7. The device according to claim 5, wherein said second permanent magnet and said locking body are identical.

8. The device according to claim 1, wherein said first permanent magnet axially connects said rod with said touch pin.

9. A bistable device for representation of a point of a tactile information, comprising a housing defining an upper touch surface formed with a vertical bore, a touch pin having an upper touchable end and defining a shifting direction, being axially shiftably disposed in said bore between a lifted position, in which said touchable end projects over said touch surface and a lowered position in which said touchable end is underneath said touch surface, a locking body mounted in said housing pivotally about an axis extending parallel to the shifting direction defining at least one pivoting plane and shiftable from an inoperative position into an operative position and reversely, in said operative position said locking body blocks a shifting of said touch pin into said lowered position, in said inoperative position said locking body permits the shifting of said touch pin into said lowered position, an electromagnet means for operatively moving said touch pin, said electromagnet means has an immoveable hollow core mounted in said housing and a magnetic coil surrounding said hollow core, said electromagnetic means forms an upper front pole and a lower rear pole, the latter facing away from said touch pin, a non-magnetic rod is pivotally and axially displaceably guided in said hollow core, said rod being connected to and lengthening said touch pin, said rod having a rear end portion facing away from said touch pin and adjacent to said rear pole of said electromagnetic means, said rear end portion cooperating with said locking body, said non-magnetic rod and said locking body are made of a non-retentive magnetizable material, respectively, said locking body is formed in one-piece on said rear end portion of said rod, a permanent magnet is immoveably mounted in said housing adjacent said rear pole of said electromagnet means, said permanent magnet has a pole axis substantially perpendicularly crossing the shifting direction, said locking body forms a magnet pole means cooperating simultaneously with both of the poles of said permanent magnet, said magnet pole means, upon excitation of said electromagnet means, for producing a turning moment for pivoting said locking body in a direction of rotation dependent on the excitation, two engagement planes mounted in said housing, said engagement planes are staggered in the direction of pivoting of said locking body, said engagement planes are parallel to said pivoting plane of the locking body, said engagement planes are also spaced from each other in the shifting direction by a distance equal to the difference in height between said lifted position of said touch pin and said lowered position of said touch pin, said locking body selectively engaging on said engagement planes, respectively, an inoperative position and an operative position of said magnet pole means of said locking body being determined by said engagement planes.

10. The device according to claim 9, wherein said locking body and said rod are formed from a metallic blank, said metallic blank has a free end and a longer straight section, said free end is bent by 90° relative to said longer straight section, the latter forms said rod, and said free end forms said locking body.

11. The device according to claim 9, further comprising a step having two main surfaces constituting said two engagement planes, said main surfaces are arranged adjacent to the poles of said permanent magnet, respectively.

* * * * *